US 8,231,718 B2

(12) United States Patent
Cho et al.

(10) Patent No.: US 8,231,718 B2
(45) Date of Patent: Jul. 31, 2012

(54) SEALED AIR PURIFIER

(75) Inventors: Yu-Kuei Cho, Longjing Township (TW); Hsi-Chuan Huang, Changhua (TW)

(73) Assignees: Hsi-Chuan Huang, Changhua (TW); Yun-Da Song, Longjing Township (TW)

( * ) Notice: Subject to any disclaimer, the term of this patent is extended or adjusted under 35 U.S.C. 154(b) by 289 days.

(21) Appl. No.: 12/623,398

(22) Filed: Nov. 21, 2009

(65) Prior Publication Data
US 2011/0120313 A1 May 26, 2011

(51) Int. Cl.
*B01D 46/00* (2006.01)
(52) U.S. Cl. ............ 96/224; 96/417; 422/4; 422/24; 422/121; 55/418; 55/471
(58) Field of Classification Search ............ 55/315, 55/342, 344, 355, 418, 420, 467, 475, 480, 55/482–489, 471; 96/223, 224, 417, 422; 422/4, 22, 24, 25, 39, 40, 112, 114, 115, 422/121
See application file for complete search history.

(56) References Cited

U.S. PATENT DOCUMENTS

| | | | | |
|---|---|---|---|---|
| 5,837,040 | A * | 11/1998 | Caughron et al. | 96/224 |
| 6,623,544 | B1 * | 9/2003 | Kaura | 95/3 |
| 7,326,387 | B2 * | 2/2008 | Arts et al. | 422/186.3 |
| 2004/0047776 | A1 * | 3/2004 | Thomsen | 422/186.07 |
| 2004/0146437 | A1 * | 7/2004 | Arts et al. | 422/186.07 |
| 2008/0022640 | A1 * | 1/2008 | Paulson et al. | 55/467 |

* cited by examiner

*Primary Examiner* — Duane Smith
*Assistant Examiner* — Sonji Turner
(74) *Attorney, Agent, or Firm* — Wang Law Firm, Inc.; Li K. Wang

(57) ABSTRACT

A sealed air purifier is disclosed. A housing is formed by connecting a first shell and a second shell. The first shell and the second shell communicate via separable connecting base and connector. A retractable bag encloses the connecting base and the connector. A sealing structure is provided between both ends of the bag. The first shell has an air inlet connecting the inside and the outside and a gate to control the airflow. A compression assembly is disposed in the first shell. The second shell has an air outlet connecting the inside and the outside and a blocking element to control the air outlet. The second shell has a sterilizing device and a super ULPA filter. When the gate closes the air inlet, the compression assembly, sterilizing device, and the air outlet close correspondingly, so that the inside of the housing is isolated. Thus, the viruses remaining therein do not spread with air.

9 Claims, 5 Drawing Sheets

SEALED AIR PURIFIER

BACKGROUND OF THE INVENTION

1. Field of Invention

The invention relates to a sealed air purifier that can greatly prevent infections. It is characterized in that:
1. The interior of the disclosed sealed air purifier is completely sealed when it is not in use. Therefore, viruses filtered out by the super ULPA filter do not spread all over with air. The infection rate can thus be largely reduced.
2. The super ULPA filter and the sterilizing device that need to be replaced periodically are disposed in a disposable second shell. When replacing the second shell, it is completely isolated from the environment as a sealed filter system. Therefore, the safety of the person who replaces the second shell can be guaranteed.

2. Related Art

Since the outbreak of SARS and H1N1, wearing a mask in the public area has become a popular practice for most people. However, all but N95 masks cannot filter viruses of size smaller than 0.5 um at the 95% level. So most of the masks are not so effective in preventing infections. However, there are relatively few N95 masks. The filtered viruses also stay thereon. That is, the viruses filtered by the N95 mask may still propagate via air. So there is still contamination.

The common air purifier uses a fan to circulate air and force it to be filtered. Even if a high-efficiency HEPA filter is used to capture viruses larger than 0.3 um, the viruses filtered out by it are not restricted in a sealed space. They can still spread into space. This is one of its drawbacks. Moreover, there is a huge risk for a person to make periodic replacements of the HEPA filter. Since the HEPA filter is not completely sealed and isolated, the person may be infected during the replacement. This is its second shortcoming.

In view of the foregoing, the invention provides an entirely new sealed air purifier to resolve the above-mentioned problems.

SUMMARY OF THE INVENTION

The invention provides a sealed air purifier whose housing has an air inlet connecting its inside and outside. There is a gate to control the air inlet.

The housing has an air outlet connecting its inside and outside. A blocking element is installed to control the air outlet.

The housing has a processing device that can detect the displacement of the gate. Between the air inlet and the air outlet side the housing, there are in sequence a compression assembly, a sterilizing device, and a super ULPA filter. When the air inlet at the gate is open, the processing simultaneously starts the compression assembly and the sterilizing device in order to force air to enter the sterilizing device via the air inlet and get pressurized to go through the super ULPA filter. At this moment, the blocking element opens the air outlet for outputting sterilized air. When the air inlet at the gate is closed, the processing simultaneously shuts down the compression assembly and the sterilizing device. At this moment, the blocking element closes the air outlet so that the inside of the housing is completely sealed and isolated. The viruses filtered therein do not spread out via air. This mechanism greatly prevents possible infection.

Another embodiment of the invention provides a sealed air purifier whose housing is formed by connecting the first shell and the second shell, as described before. The first shell and the second shell are connected via separable connecting base and connector. A retractable bag is mounted outside the connecting base and connector. A sealing structure is provided between both ends of the bag.

The first shell has an air inlet, a gate for controlling the air inlet, a processing device that can detect the gate displacement. A compression assembly is disposed in the first shell as well. When the compression assembly functions, it delivers pressurized air to the second shell via the connecting base and the connector.

The second shell has a blocking element connecting the inside and outside. Between the connector and the blocking element inside the second shell, there are in sequence a sterilizing device and a super ULPA filter. Therefore, to replace the super ULPA filter and the sterilizing device periodically, one only needs to separate the connecting base and the connector and then seals the sealing structure of the bag. This separates the inside and outside of the second shell. The second shell thus becomes a sealed filter system. This is convenient for people to make periodic replacements of the second shell.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

Figure 1:
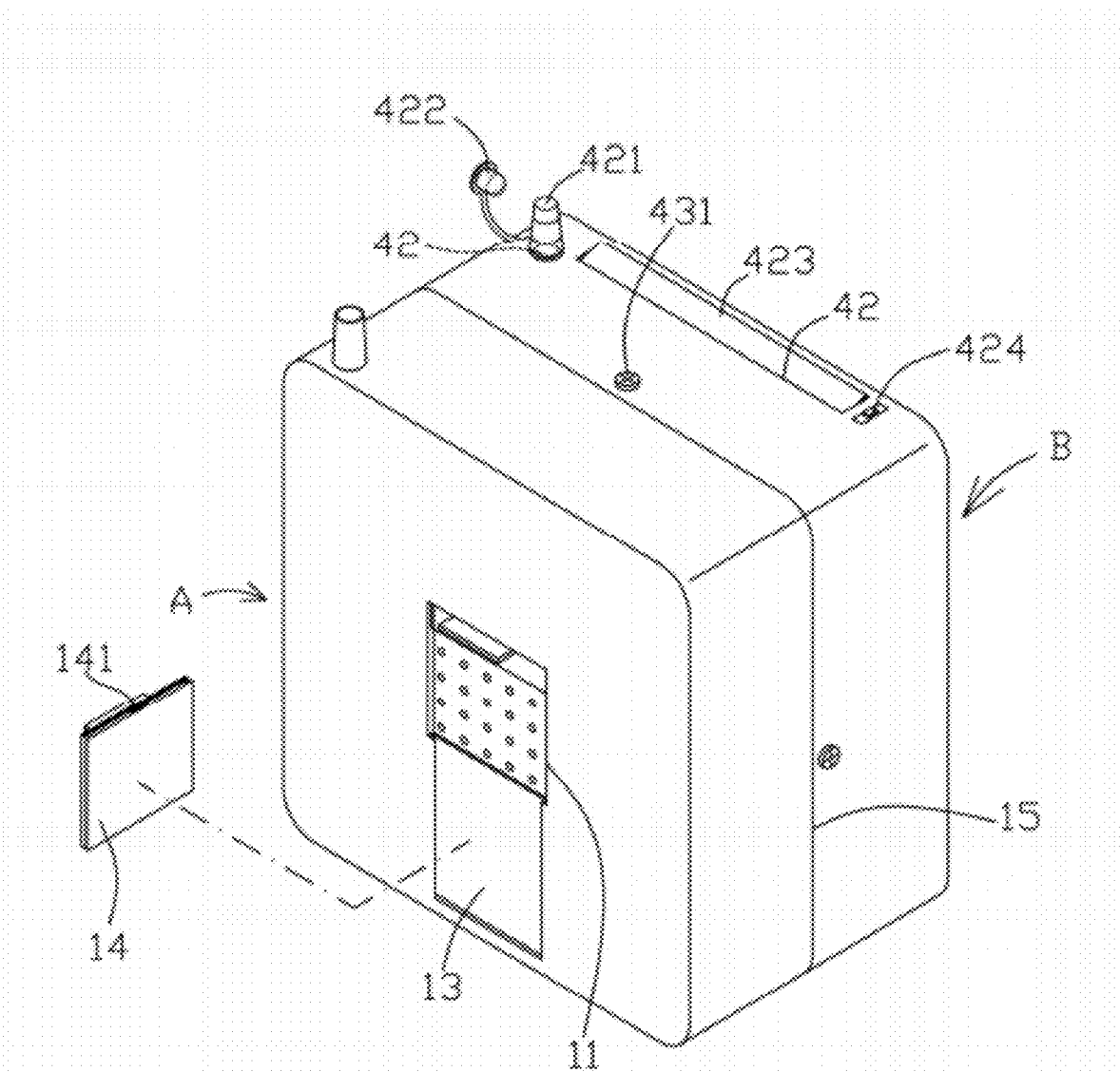
FIG. 1 is a three-dimensional assembly view of the invention.
Figure 2:
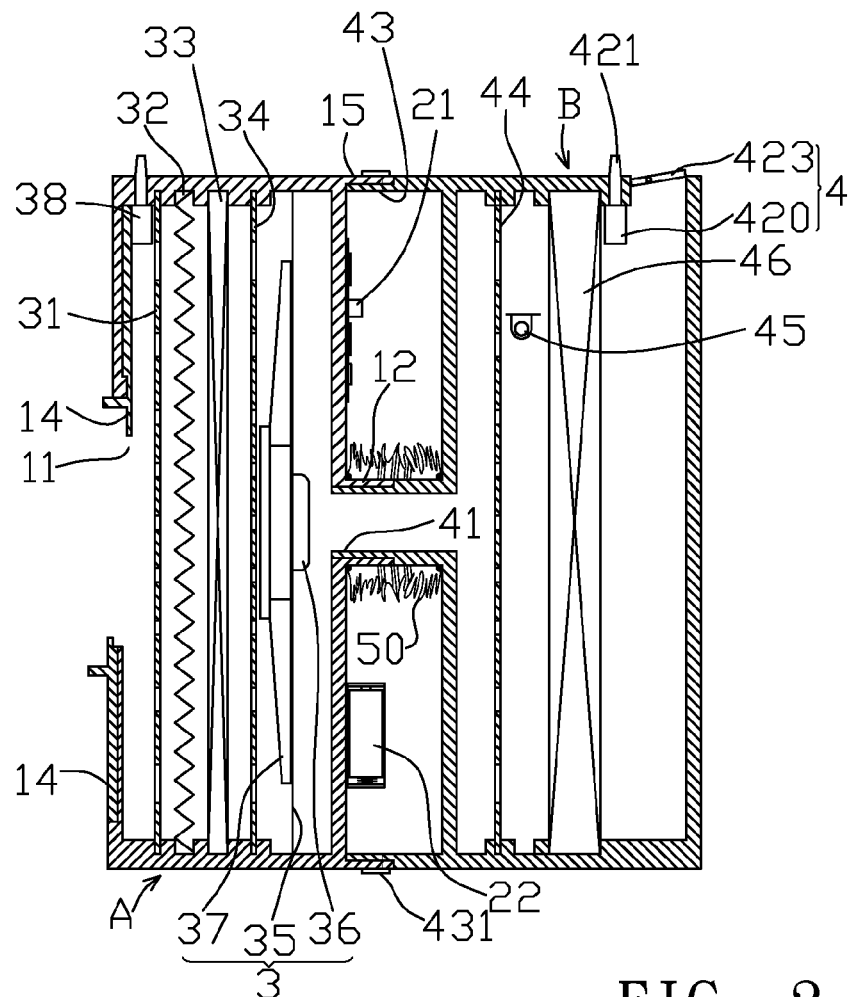
FIG. 2 is a cross-sectional view of the invention.
Figure 3:
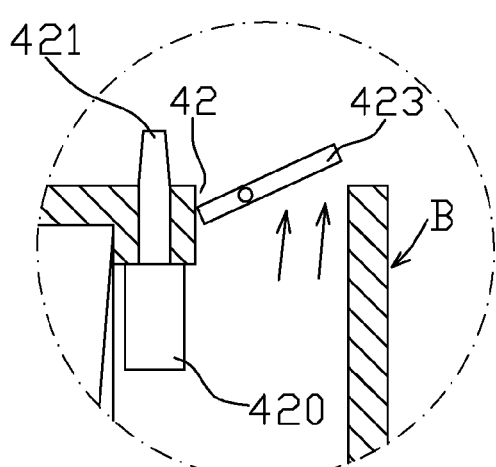
FIG. 3 is a locally enlarged view of the invention.

The present invention will be apparent from the following detailed description, which proceeds with reference to the accompanying drawings, wherein the same references relate to the same elements.

Please refer to FIGS. 1 to 7. The disclosed housing consists of a first shell A and a second shell B connected face to face.

The first shell A has a hollow room, an air inlet 11 on its front surface to connect the inside and outside, a hollow connecting base 12 on its rear surface to connect the inside and outside. Above and below the air inlet 11, the front surface of the first shell A has a turtledove tail track 13, respectively. Each track 13 has a gate 14 sliding thereon. The two gates 14 can slide to open or close the air inlet 11. One of the gates 14 is installed with a touch-control switch 141. Besides, the rear surface of the first shell A is protruded with a mounting frame 15 so that an open space formed between the mounting frame 15 and the connecting base 12. The open space is disposed with a processing device 21 that receives the signal control of the touch-control switch 141 and a power supply 22 for supplying the power needed by the processing device 21.

The hollow room of the first shell A has in sequence an air homogenizer 31, a pre-filter 32, an active carbon filter 33, an air homogenizer 34, and a compression assembly between the air inlet 11 and the connecting base 12. The compression assembly involves a motor 36 fixed on a supporting board 35. The motor 36 is controlled by the processing device 21. A fan 37 is mounted on the axle of the motor 36. When the gates 14 open the air inlet 11, the touch-control switch 141 enables the processing device 21 to activate the compression assembly simultaneously with the gates 14. Therefore, the fan 37 can smoothly draw air via the air inlet 11 into the hollow room of the first shell A. The air is forced to go through the air homogenizer 31, the pre-filter 32, the active carbon filter 33, and the air homogenizer 34 before it enters the connecting base 12. The air is pressurized to high density and sent to the second shell B.

Figure 4:
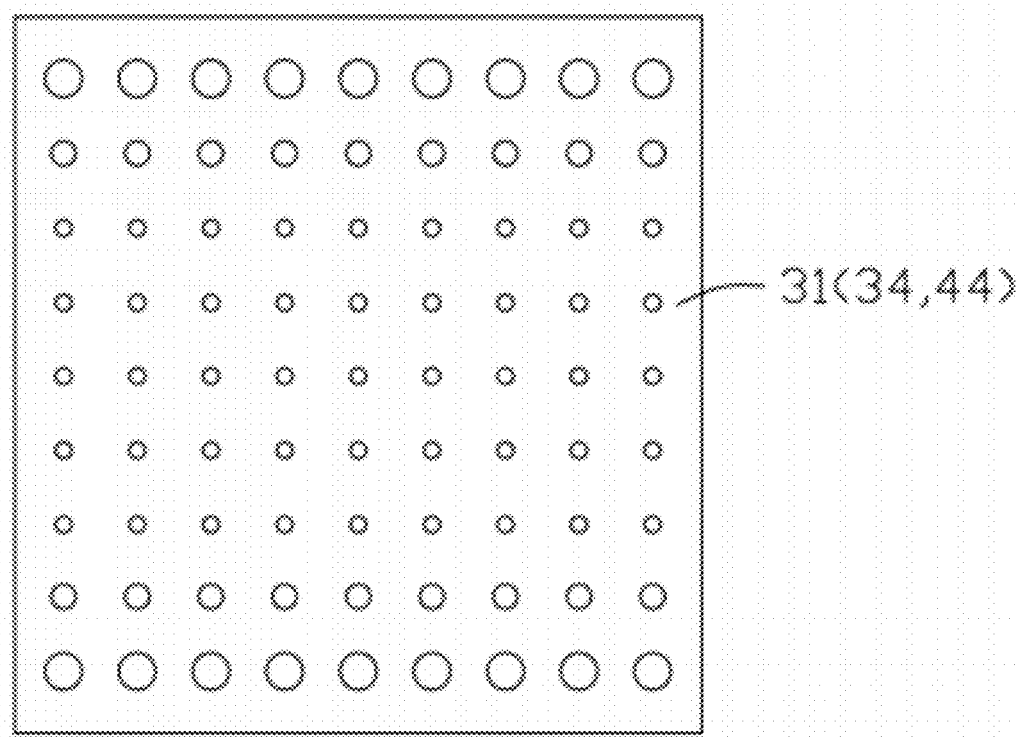
FIG. 4 is a schematic view of the air diffuser in the invention.
Figure 5:
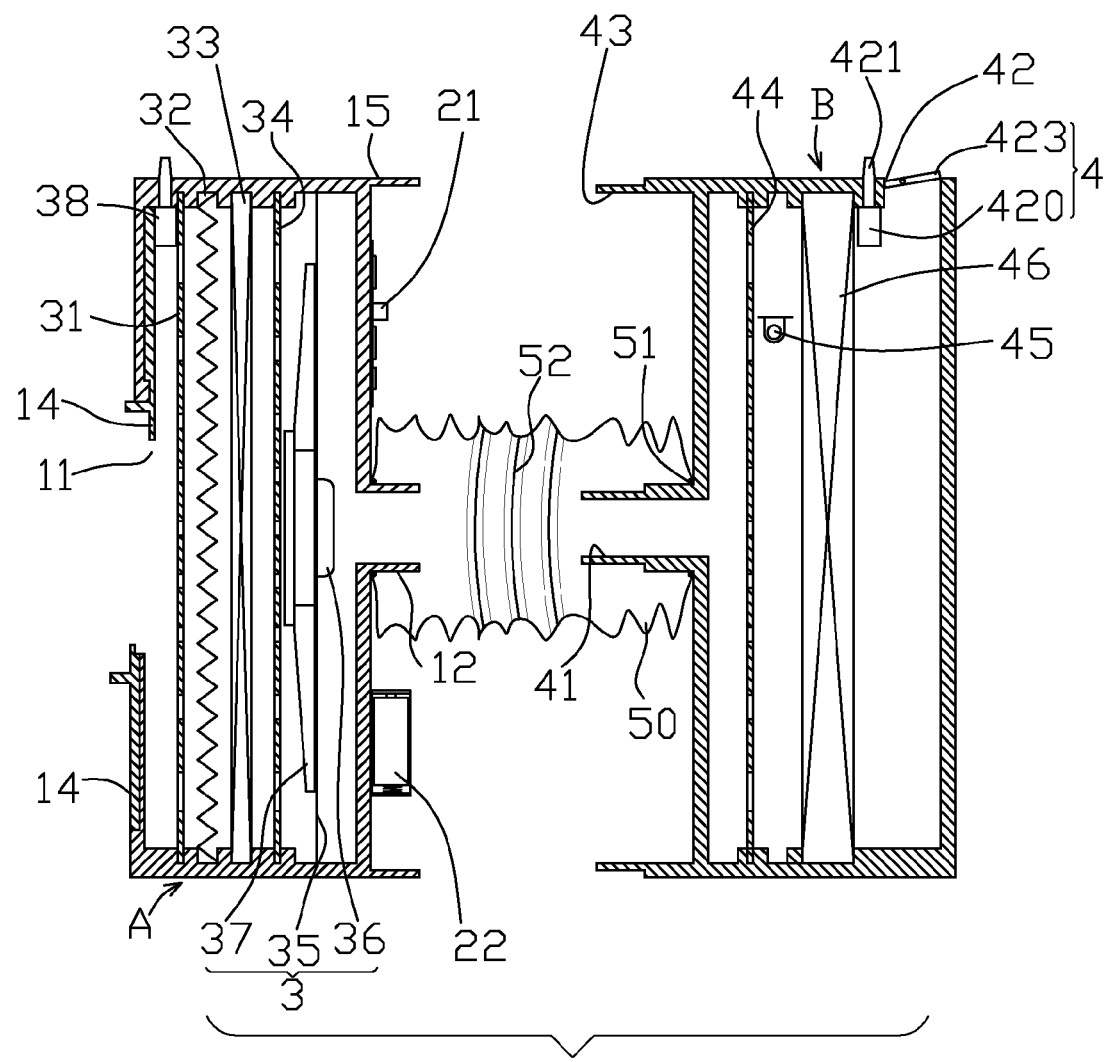
FIGS. 5 and 6 are schematic views of replacing the second shell.

The structure of the air homogenizer 31 is shown in FIG. 4. It has several holes going through. The diameters of the holes are proportional to the distance to the air inlet 11, so that the air can more homogeneously go through the air homogenizer 31. The pre-filter 32 can thus filter the air more thoroughly.

The second shell B also has a hollow room. Its front surface has a hollow connector 41 connecting its inside and outside. The top surface on its rear part has two air outlets 42 connecting the inside and outside. The two air outlets 42 are installed with a blocking element, respectively. One of the blocking elements is a one-way valve 420 for ventilation. The one-way valve 420 has a nozzle 421 protruding to the outside, for a connection with an air mask, mask, or nasal tube. When the one-way valve 420 is not in use, a cover 422 seals the nozzle 421. The other blocking element is an eccentric one-way gate 423 for ventilation. More explicitly, only one of the one-way gate 423 and the one-way valve 420 is used at a time. Therefore, when the one-way valve 420 is connected with an air mask, the one-way gate 423 can be controlled to close by a button 424 provided on the second shell. The front surface of the second shell B is protruded with an inserting frame 43, which matches with the mounting frame 15. With screws 431, the first shell A and the second shell B are connected together. At the same time, the connector 41 and the connecting base 12 are connected so that the hollow rooms thereof are in fluid communications. Between the connector 41 and the air outlet 42 inside the second shell B, there are in sequence an air homogenizer 44, a sterilizing device 45 comprised of a UV lamp, and a super ULPA filter 46 to filter particles of size 0.1 µm or smaller in the air. When the gates 14 are open, the processing device 21 simultaneously starts the compression assembly and the sterilizing device 45. Air is pressurized to go through the super ULPA filter 46. The air outlet 42 then outputs air without viruses. The sterilizing device 45 can kill viruses on the surface of the super ULPA filter 46 and the highly pressurized air. The number of viruses in the hollow room of the second shell B is then reduced to its minimum. When the air inlet 11 at the gates 14 is closed, the processing device 21 simultaneously shuts down the compression assembly and the sterilizing device 45. At this moment, the blocking element closes the air outlet 42.

Figure 6:
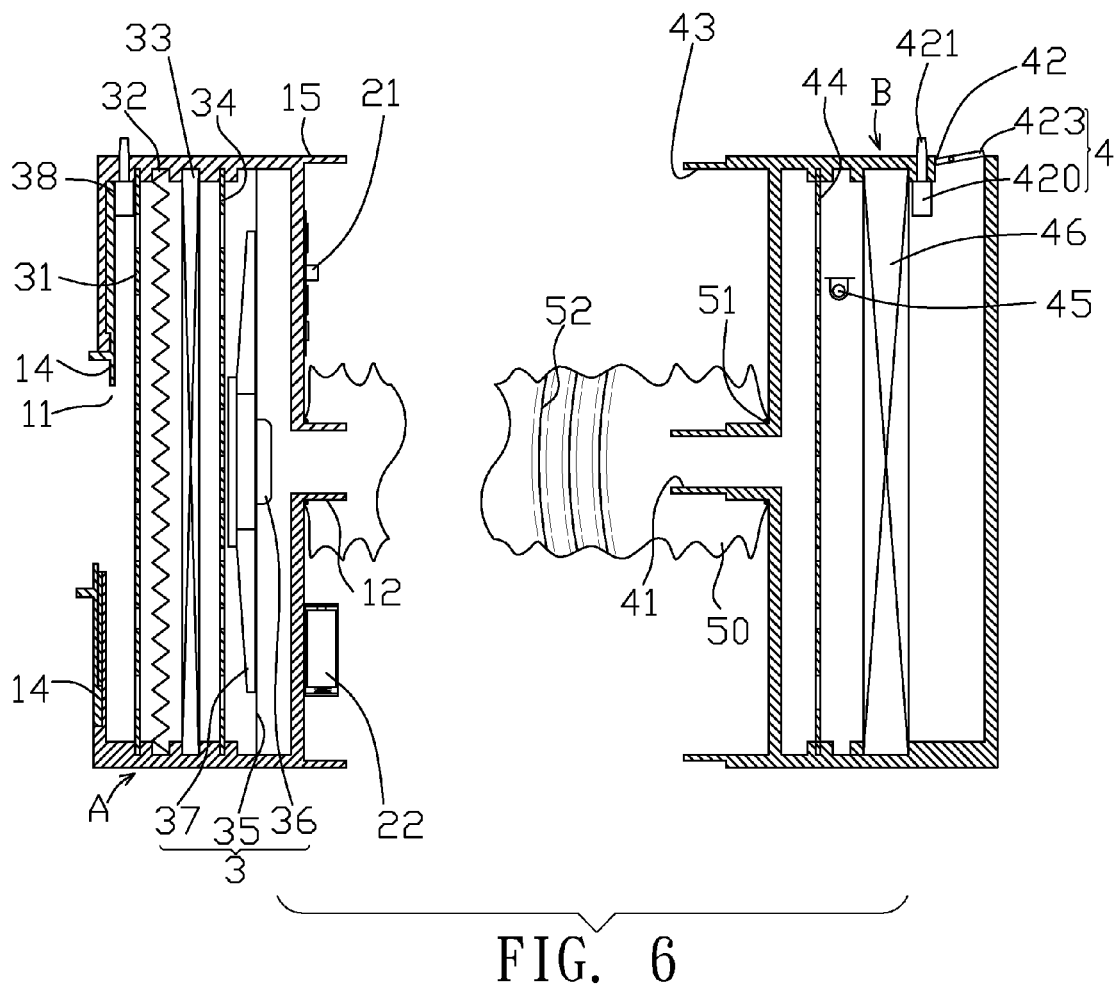
Figure 7:
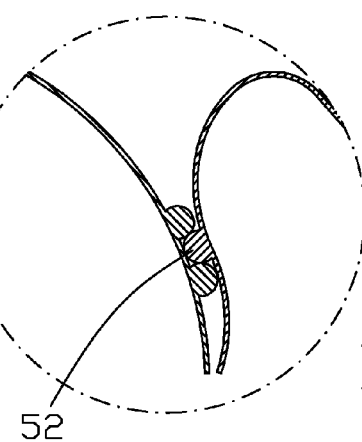
FIG. 7 is a schematic view of the disclosed sealing structure.

Besides, a retractable bag 50 covers the connecting base 12 and the connector 41. Both ends of the bag 50 are fixed by rubber bands 51 on the corresponding connecting base 12 and connector 41. A sealing structure 52 is provided across the two ends. The sealing structure 52 consists of at least a pair of press strip and groove, as shown in FIG. 7. When the sterilizing device 45 and the super ULPA filter 46 reach the end of their lifetime, one can separate the first shell A and the second shell B, extending the bag 50 as in FIG. 5. Then the user seals both ends of the bag 50 using the sealing structure 52. Afterwards, the user can use scissors to cut the left end of the bag 50, as shown in FIG. 6. Through this mechanism, the hollow room inside the second shell B does not communicate with the exterior at all. It becomes a sealed filter system. It is then impossible for the viruses therein to spread out. The user can thus safely replace the second shell B.

According to the above description, the processing device 21 can control to shut down the compression assembly and the sterilizing device 45 when the gates 14 close the air inlet 11. Thus, the air inlet 11 and the air outlet 42 are both closed to form an isolated and sealed system inside the housing. The viruses staying therein cannot propagate with air. It should be mentioned that the invention can be installed with a one-way inlet valve 38 connecting the inside and outside on the front edge of the first shell A. When the gates 14 close the air inlet 11 and the fan 37 is still running due to inertia, the one-way inlet valve 38 can be forced to open so that the hollow room of the first shell A is not partly vacuum.

In summary, the invention can indeed avoid all sorts of troubles and inconvenience in conventional air purifiers. Moreover, the structure of the invention also has its novelty which is superior to the prior art.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A sealed air purifier whose housing has an air inlet connecting its inside and outside and is installed with a gate for controlling the air inlet;
    wherein the housing has an air outlet connecting the inside and outside and a blocking element for controlling the air outlet; the housing is installed with a processing device that detects the displacement of the gate; the housing consists of a first shell and a second shell connected together; the first shell and the second shell are connected by a separable connecting base and connector; a retractable bag encloses the connecting base and the connector; a sealing structure is disposed between both ends of the bag; a compression assembly, a sterilizing device, and a super ULPA filter are disposed in sequence between the air inlet and the air outlet inside the housing; the compression assembly is disposed in the first shell so that pressurized air is delivered to the second shell via the connecting base and the connector when the compression assembly functions; when the air inlet at the gate is open, the processing device simultaneously starts the compression assembly and the sterilizing device so that air flows through the air inlet, the sterilizing device, and passes through the super ULPA filter at an increased pressure, and the blocking element opens the air outlet for outputting sterilized air; the second shell has the air outlet connecting the inside and outside and a blocking element for controlling the air outlet; when the air inlet at the gate is closed, the processing device simultaneously closes the compression assembly and the sterilizing device, and the blocking element closes the air outlet as well; a sterilizing device and a super ULPA filter are disposed in sequence between the connector and the air outlet inside the second shell; when the super ULPA filter and the sterilizing device needs to be replaced periodically, one only needs to separate the connecting base and the connector and then seal the sealing structure of the bag, rendering the second shell a sealed filter system.

2. The sealed air purifier of claim 1, wherein the processing device makes the action of the gate synchronous with the actions of the compression assembly and the sterilizing device.

3. The sealed air purifier of claim 2, wherein the gate is installed with a touch-control switch so that when the gate opens the air inlet, the switch of the touch-control switch enables the processing device to control the gate concurrently with the actions of the compression assembly and the sterilizing device.

4. The sealed air purifier of claim 1, wherein both ends of the bag are fixed to the corresponding connecting base and the connector by rubber bands; and the sealing structure consist of at least a pair of press strip and groove.

5. The sealed air purifier of claim 1, wherein the inside of the first shell is disposed with an air diffuser, a pre-filter, an active carbon filter, an air diffuser, a compression assembly in sequence between the air inlet and the connecting base; the compression assembly has a motor fixed on a support board; the motor is controlled by the processing device and a fan is mounted on the axle of the motor; the air diffuser is formed with a plurality of holes whose diameters are proportional to the distance to the air inlet.

6. The sealed air purifier of claim 1, wherein the first shell is protruded with a mounting frame on the surface of the connecting base, an open space is formed between the mounting frame and the connecting base and is disposed with the processing device and a power supply that supplies the power for the processing device; the second shell is protruded with an inserting frame corresponding to the mounting frame on its front surface; the first shell and the second shell are connecting using screws so that the connector and the connecting base are joined for the first shell and the second shell to be connected.

7. The sealed air purifier of claim 1, wherein an air diffuser, a sterilizing device, and an super ULPA filter for filtering particles of size 0.1 µm or smaller in the air are disposed in sequence between the connector and the air outlet.

8. The sealed air purifier of claim 1, wherein the second shell has two air outlets connecting the inside and outside; the two air outlets are installed with blocking elements, respectively; one blocking element is a one-way valve for ventilation and has a nozzle protruding to the outside; the other blocking element is an eccentric one-way gate for ventilation; and a button to close the one-way gate is provided on the second shell.

9. The sealed air purifier of claim 8, wherein the nozzle of the one-way valve is sealed by a cover.

\* \* \* \* \*